Patented May 31, 1949

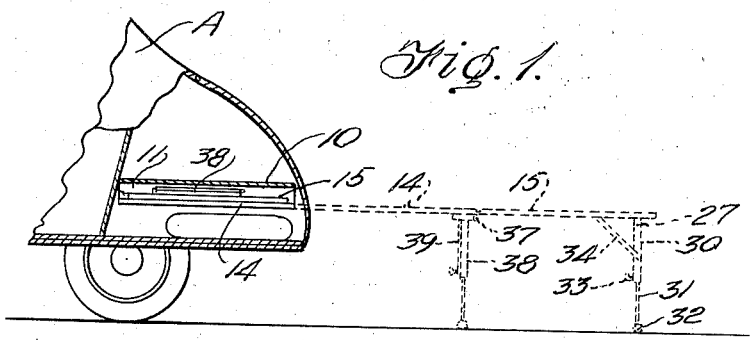

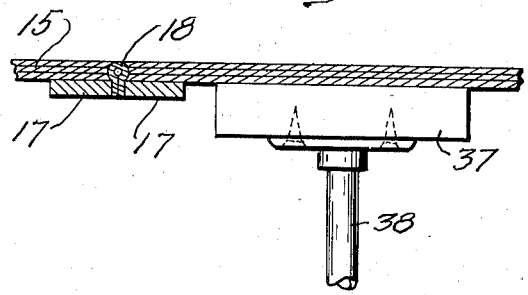
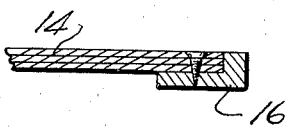
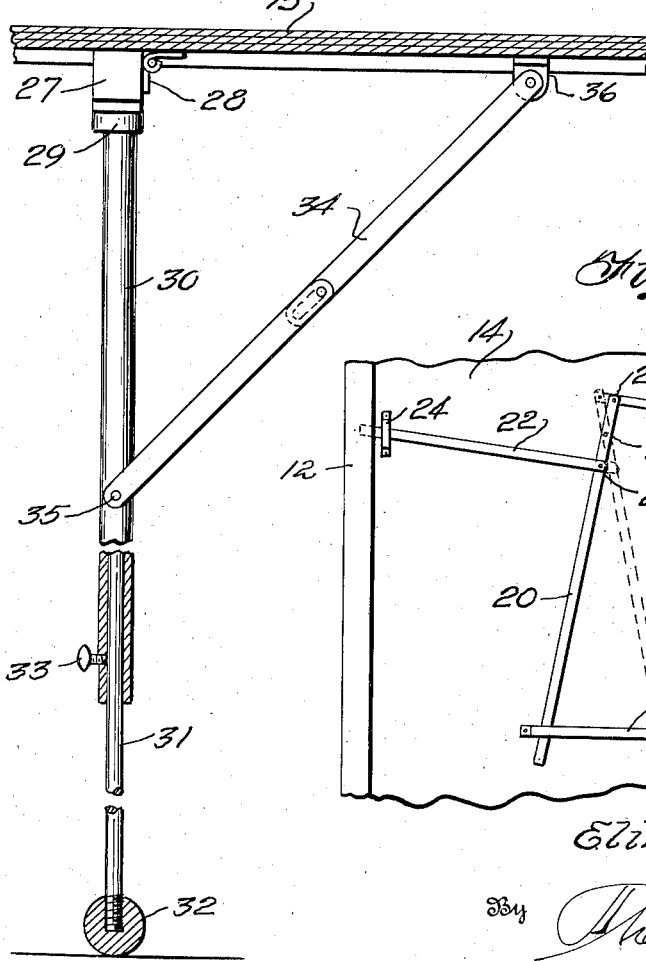
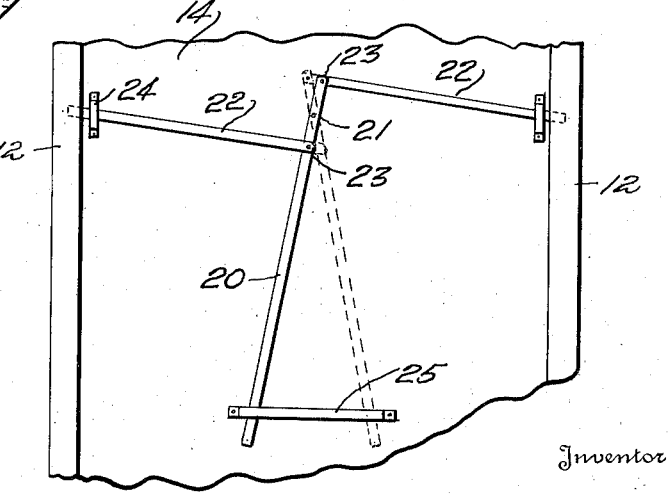

2,471,730

UNITED STATES PATENT OFFICE 2,471,730

TABLE ATTACHMENT FOR AUTOMOBILE LUGGAGE COMPARTMENTS

Elizabeth C. Doerr, Newburgh, N. Y.

Application December 5, 1944, Serial No. 566,676

4 Claims. (Cl. 311—21)

This invention relates to automobiles and has special reference to a table attachment for automobiles.

Many of the present day automobiles are provided with a rear luggage compartment for packages and the like and this rear compartment is closed by a door accessible from the exterior of the automobile.

One important object of the present invention is to provide a table attachment to be housed within the interior of the rear compartment of an automobile and adapted to be moved in and out of such compartment.

A second important object of the invention is to provide a device of this character wherein the table, when not in use, may be housed in a suitable flat casing within the automobile rear compartment, the arrangement being such as to afford a minimum of obstruction for the storing of articles in this rear compartment.

A third important object of the invention is to provide a novel device of this character wherein the front edge of the table will be supported by the automobile while in use and wherein the projecting portions of the table are provided with suitable telescopic legs.

With the above and other objects in view the invention consists in general of certain novel details of construction and combinations of parts hereinafter fully described, illustrated in the accompanying drawings and particularly claimed.

In the accompanying drawings Figure 1 is a view partly in elevation and partly in section showing the rear portion of an automobile and the foldable table, the latter being shown folded and packed in full lines and extended for use in broken lines.

Figure 2 is an enlarged rear view of the table and its housing, the automobile parts being omitted.

Figure 3 is a fragmentary view partly in elevation and partly in section showing the table and the rear portion of the housing, the table being shown as set up.

Figure 4 is a fragmentary view showing the manner of attaching the table legs and also the manner of hinging the table leaves.

Figure 5 is a fragmentary section showing one edge of a table leaf.

Figure 6 is a fragmentary view showing the ararngement of one of the table legs and its bracing, Figure 7 is a fragmentary view of the under side of one of the table leaves showing a portion of the device for locking the leaf in stored position, and Figure 8 is a detail sectional view of a part of the platform showing a latch-receiving opening in a side member thereof.

In the arrangement of the device as herein shown, there is fitted within the rear compartment of an automobile A, a platform 10 which is arranged in horizontal position and spaced above the bottom of the compartment. At each side of this platform is a depending side member 11 to the bottom edge of which is securely fastened an inwardly projecting flange 12. This construction provides a pair of opposed run-ways and these run-ways are parallel. At the rear or mouth end of each run-way, a stop piece 13 is secured to the platform 10. The structure thus described forms the housing for the table.

The table per se is preferably made of a pair of plywood leaves of which 14 may be termed the front leaf and 15 is termed the rear leaf. At each edge of each leaf there is fitted a reinforcing strip 16 rabbeted to receive the longitudinal edge of the plywood. At the junction of the rear and front leaves of the table the edges are reinforced by strips 17 so that a hinge or hinges 18 may connect the two leaves and permit the rear leaf to fold over on the front leaf. Each inner corner of the front leaf 14 has fitted thereon a stop member 19 which, when the table is fully extended, engages against a respective stop member 13 and thus prevents the table from being pulled entirely out of the housing.

Beneath the front leaf is mounted a lever 20 which is pivoted to the leaf at 21 and latch rods 22 have inner ends conected to the lever 20 on opposite sides of and equidistant from the pivot 21 as shown at 23. These rods have their outer ends working in guides 24 and a guide 25 is provided for the handle end of the lever 20. At the inner ends of the members 11 are slots 26 which, when the front leaf 14 is shoved entirely into the housing will be engaged by the latch bars 22 upon proper manipulation of the lever 20. This locks the table in the housing, it being obvious that the rear leaf will be folded on the front leaf before the table is pushed into the housing.

Adjacent to the rear edge of rear leaf 15 a strip 27 is secured to the under side of the leaf by hinge means 28. On the bottom of this strip is secured a pair of sockets 29 from which tubular leg portions 30 extend downwardly to receive lower leg portions 31 having ball feet 32. This structure provides telescopic legs hinged to the rear leaf and these legs are held in telescopically adjusted position by thumb screws 33. Diagonal folding braces 34 are pivoted to the tubular portions 30 of the leg as at 35 and to brackets 36 secured beneath the rear leaf 15 and to the rear of the strip 27. This arrangement permits the legs formed by the basic members 30 and 31 to be folded upward concurrently beneath the rear leaf 15 by pivotal movement of strip 27, thus placing them in position for ready folding of the leaf into superposed relation to the front leaf with the legs positioned above and thus readily movable into the compartment for housing.

Beneath the rear zone of the front leaf 14 is also a block 37 which is hinged similar to the strip 27 and carries a telescopic leg 38 having a brace 39. This leg construction is like that previously described except that the brace 39 and the hinge for this leg are at right angles to the braces 34 and hinge 28 so that the leg 38 folds laterally beneath the leaf 14; the block 37 is preferably positioned in a mid-zone of the width of the leaf 14, as indicated in Figure 2. Clips 40 receive and hold the legs when folded.

When the device is in storage the legs are folded against the lower sides of the respective leaves, the rear leaf being on top of the front leaf and the latch rods 22 engaged in slots 26. When it is desired to use the device, the door of the rear compartment is opened, the hinged edges of the two leaves are grasped and the table drawn rearwardly until the stop members 19 engage the stop pieces 13. Then the leaf 15, which is slightly shorter than the leaf 14, is swung on its hinge, the legs dropped to engage the ground and fully adjusted so the unfolded table is horizontal.

As will be understood from the drawings, the assemblage provides a structure readily produced by simple mechanical methods, and provides a table structure of the planar top type, supported in such form as to be extremely steady and substantial in action, and yet is of such form as to be readily foldable into relationships such as will enable bodily movement into housed position and readily accommodated within the restricted space of the luggage compartment. The various members are so formed and mounted as to require no actual disengagement of parts from the assemblage—adjustment of leg lengths may be required to meet particular conditions, but there is no actual removal of parts. In other words, the assemblage is so formed that it can be folded into the compact form required for housing, but the folding does not affect the form of the assemblage; hence, it is necessary only to draw out the housed assemblage, unfold it, brace the legs through the braces, and adjust the leg length, the relation of the parts positionally—other than the foldability—remaining constant.

The result is obtained by forming the table top in two sections, pivotally connected in such manner that the rear section can be folded into superposed relation to the front section and lie substantially flat thereon; hence, both sections can be moved into and out of housed position as a unit, the rear section being of sufficient shorter length as to permit such folding, the front section being so dimensioned and mounted as to be slidable relative to its supporting ways, but incapable of being completely withdrawn from such ways, due to the stop formations. Hence, the front of the table is actually supported by such ways; since the latter are located at the sides of the table path, such support is at both of the front corners of the table.

The rear legs of the table are positioned in the rear corner zones of the table—the rear zone of leaf 15 when the latter is unfolded. Both legs 30 are carried by strip 27, itself hingedly connected to the under face of the leaf, with the hinging such that the legs, when folded, extend in fore and aft direction. Since folding of leaf 15 into superposed relation to leaf 14 places such rear zones of the leaf 15 in the forward part of the compartment when the structure is housed, the housed length of the legs is materially reduced as compared with the service length, since the entire leg structure must also be contained within the compartment. Hence, each of legs 30 is formed sectional (Fig. 6) to permit this change in length dimension. The leg structures overlie the leaf 15 in the housed condition.

One of the conditions produced by the table formed in this manner is the fact that not only is the table length, in service, considerable, but contains a transverse hinging line in the mid-zone of such length with the hinging action such as will permit the desired folding of leaf 15 onto the top of leaf 14; as a result the structure would be vulnerable in service if the table support were limited to the corner zones, since the mid-zone and any content located thereon provide a weight factor effective to act on the hinging line to set up the characteristics of the folding of the leaf 15. Since this action must be prevented, leg support in the vicinity of the hinging line is required, and is provided by the single leg 38 which is located in an intermediate zone in the width of leaf 15; the leg is similar in type to the remaining legs, and is mounted on block 37 with the latter hinged in such manner that the leg folds in the direction of width of the table; since the leg is carried by leaf 14, the folded leg will underlie leaf 14 when the assemblage is housed where its free end is carried by a clip 40. Obviously, leg 38 may be mounted in an intermediate zone of leaf 15 adjacent the hinging line, with block 37 hinged to permit fore and aft movement of leg 38—thus placing all the legs as overlying leaf 15 in the housed positions. However, the arrangement shown is preferred since such arrangement provides a leg support for leaf 14 to offset any tendency to instability of the leaf supported at the front by the ways and at the rear by the hinging line—the leg thus protects the hinging line as well as relieving the front support from undesired pressures. The folded leg does not interfere with the operation of lever 20 when locking the folded assemblage in its housed condition.

What is claimed is:

1. In table attachment assemblages for automobiles, wherein the luggage compartment of the auto receives the table portion of the assemblage for transportation and housing purposes, and wherein the table portion is sectional and positionable for service rearward of the compartment with the sections presenting a substantially planar top having one end supported by the auto and with the planar top additionally supported by leg formations, an assemblage of such type including front and rear sections hingedly connected to permit folding into superposed positions with the rear section overlying the front section, said sections being supported in such superposed relation within the compartment with the front section carried by and movable on ways positioned within the compartment, said ways and front section having cooperating means for preventing complete withdrawal of the front section from the ways to thereby place the ways as a support for the front end of the table in service, the fore and aft length of the rear section being less than that of the front section to permit free swinging of the rear section about the hinging axis to form the planar top formation for service, said rear section having its free end zone equipped with a pair of pivoted leg formations each movable pivotally in fore and aft direction between a position to support such table and a position to overlie the rear section when the sections are housed, one of said sections carrying a single pivoted leg formation with the formation located in the vicinity of the hinging line and positioned in an intermediate zone in the width of the section, with the single leg formation movable for housing purposes into a position of substantial parallelism with the section which carries it.

2. An assemblage as in claim 1 characterized in that the single leg formation is carried by the front section and pivoted thereto for folding movement in the direction of width of the section and with the formation underlying the front section when the assemblage is housed.

3. An assemblage as in claim 1 characterized in that each of the legs is sectional to permit length adjustment by relative longitudinal movement of the sections, each leg formation including a foldable brace connecting the leg with the leaf section by which the leg is carried, the brace being in folded position when the assemblage is housed.

4. An assemblage as in claim 1 characterized in that the front section and the ways have complemental manually operative means adapted to be rendered active when the assemblage is in housed position for locking the assemblage in such position.

ELIZABETH C. DOERR.

REFERENCES CITED

The following references are of record in the file of this patent:

UNITED STATES PATENTS

| Number | Name | Date |
| --- | --- | --- |
| 734,155 | Barnes et al. | July 21, 1903 |
| 1,098,013 | Burton | May 26, 1914 |
| 1,582,380 | Carpenter et al. | Apr. 27, 1926 |
| 2,010,270 | Lawrence | Aug. 6, 1935 |
| 2,160,958 | Critchlow | June 6, 1939 |
| 2,214,575 | Cercownay | Sept. 10, 1940 |
| 2,228,203 | DeHoffmann | Jan. 7, 1941 |
| 2,249,845 | Mitchell | July 22, 1941 |
| 2,270,948 | Howe | Jan. 27, 1942 |
| 2,324,507 | Johnson | July 20, 1943 |